L. BULLOCK.

Improvement in Clothes-Pins.

No. 132,627.                                  Patented Oct. 29, 1872.

Witnesses

Laban Bullock
by his attorney

UNITED STATES PATENT OFFICE.

LABAN BULLOCK, OF BELLOWS FALLS, VERMONT.

IMPROVEMENT IN CLOTHES-PINS.

Specification forming part of Letters Patent No. 132,627, dated October 29, 1872.

*To all whom it may concern:*

Be it known that I, LABAN BULLOCK, of Bellows Falls, of the county of Windham and State of Vermont, have invented a new and useful Improvement in Clothes Pins or Clamps for Clothes-Lines; and do hereby declare the same to be fully described in the following specification and represented in the accompanying drawing, of which—

Figure 1:
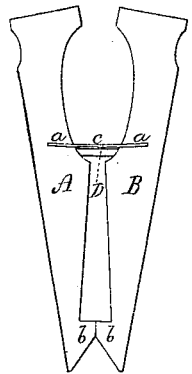
Figure 2:
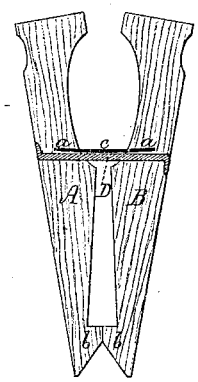

Figure 1 is a side elevation, and Fig. 2 a longitudinal and vertical section, of a clothes-pin or clamp provided with my invention.

In making clothes-pins it has been customary to compose them of two levers, formed as represented at A B in the accompanying drawing, and connected by an elastic plate, C, extending from one to the other, as shown, and being driven tightly into saw-kerfs $a\ a$ made in the two levers. By use the spring is very liable to work loose in the kerfs, and as a consequence to cease to operate to advantage or to readily admit of separation of it from one or both of the jawed levers.

In carrying out my invention I combine with the two hooked and jawed wooden levers and the connection-spring, as described, an elastic wire connection, D, to go through the two levers, alongside of or against the plate-spring C, such connection-wire being upset or riveted down at its outer ends upon the two levers. It not only constitutes an additional spring to effect closing of the jaws $b\ b$, but effectually prevents separation of either or both the levers from the plate-spring. Besides, it operates to prevent or aids in preventing the spring from working loose in the kerfs.

I make no claim to the combination and arrangement of the plate connection-spring and the two jawed levers.

What I claim as my invention, and as a new or improved manufacture, is—

The two jawed levers A B, the plate-spring C, and the elastic wire-connection D, arranged, constructed, and combined substantially as specified and represented.

LABAN BULLOCK.

Witnesses:
 RUSSELL HYDE,
 HIRAM NEWTON.